United States Patent
McElroy et al.

[11] 3,794,866
[45] Feb. 26, 1974

[54] ULTRASONIC SEARCH UNIT CONSTRUCTION

[75] Inventors: Jerry T. McElroy; Gerald J. Posakony, both of Boulder, Colo.

[73] Assignee: Automation Industries, Inc., Los Angeles, Calif.

[22] Filed: Nov. 9, 1972

[21] Appl. No.: 305,119

[52] U.S. Cl. ............ 310/8.2, 73/67.5 R, 73/71.5 U, 310/8.7, 340/8 MM, 340/8 RT
[51] Int. Cl. ............................................ H04r 17/00
[58] Field of Search .............. 310/8.2, 8.7, 9.1, 9.4; 333/30 R; 340/8 MM, 8 RT; 73/67.5 R, 71.5 U

[56] References Cited
UNITED STATES PATENTS

| | | | |
|---|---|---|---|
| 2,597,797 | 5/1952 | Holmbeck | 310/8.2 |
| 2,984,756 | 5/1961 | Bradfield | 340/8 MM |
| 3,403,271 | 9/1968 | Lobdell et al. | 310/8.2 |
| 2,972,068 | 2/1961 | Howry et al. | 340/8 MM |
| 3,546,012 | 12/1970 | Dixon | 310/8.2 X |
| 2,811,216 | 10/1957 | Harris | 340/8 RT |
| 3,185,868 | 5/1965 | Coyle et al. | 310/8.2 |

*Primary Examiner*—J. D. Miller
*Assistant Examiner*—Mark O. Budd
*Attorney, Agent, or Firm*—Dan R. Sadler

[57] ABSTRACT

An ultrasonic nondestructuve testing system and a search unit are disclosed herein. The search unit includes a transducer crystal for transmitting and receiving ultrasonic energy together with an acoustical backing structure which is disposed on the backside of the transducer crystal for dampening spurious ultrasonic energy radiated from its back-side. The backing structure includes compacted or pressed fibers of a dense, non-resonant material.

10 Claims, 3 Drawing Figures

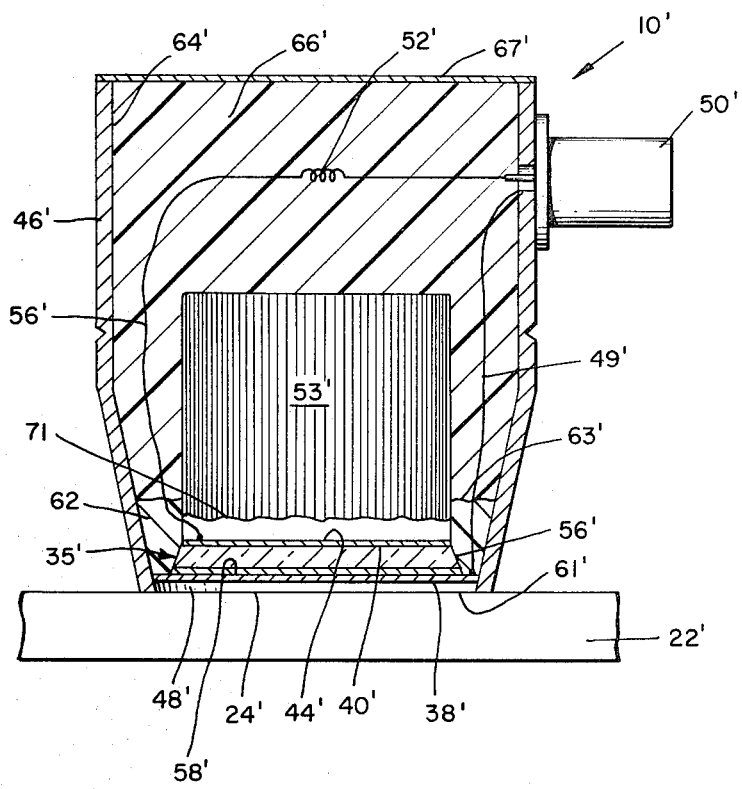

3,794,866

ULTRASONIC SEARCH UNIT CONSTRUCTION

BACKGROUND

In an ultrasonic nondestructive testing system one or more search units are provided for scanning the workpiece being tested. The search unit is adapted to transmit ultrasonic energy into the workpiece in response to an electrical driving signal applied thereto. It is also adapted to receive ultrasonic energy from the workpiece and produce a corresponding electrical signal.

In a pulse echo type of system the search unit transmits short bursts or pulses of ultrasonic energy. Echoes of these pulses are reflected from any discontinuities such as the surfaces of the workpiece, cracks, voids, inclusions, etc., inside the workpieces. These echoes return to the search unit which, in turn, generates electrical signals corresponding to the echoes. By measuring the amplitude, time delay, etc., of these received signals, it is possible to determine the size, position, etc., of the discontinuity.

In order to obtain an accurate measurement of the size, position, etc., of a discontinuity, it is necessary to accurately measure the amplitude and time, etc., of the electrical signal generated by the search unit. It is highly desirable that the pulses of ultrasonic energy transmitted by the search unit correspond closely to the electrical signal which drives the search unit. Also, it is highly desirable that the electrical signals generated by the search unit correspond closely to the ultrasonic energy received by the search unit.

One of the problems frequently encountered in search units of this type arises from the fact that it employs a transducer such as a piezoelectric crystal which physically vibrates when the electrical driving signal is applied thereto whereby the ultrasonic energy is radiated. Conversely, when the returning ultrasonic energy is incident upon the crystal it causes the crystal to physically vibrate and thereby generate the received electrical signal.

As a result of the physical vibrations, the crystal tends to "ring" (i.e., it vibrates for an extended period of time) after a pulse of ultrasonic energy is transmitted and/or received. These extended vibrations or "ringing" tend to mask and obscure the true signals.

In order to overcome these difficulties it has been proposed to provide some form of acoustical dampening for the crystal. For the dampening action to be effective, it is necessary that the dampening structure have an acoustical impedance which is the same as or at least very close to that of the crystal. It must also be "lossy" or highly attenuative.

As a practical matter, it has been found extremely difficult to provide a dampening structure which meets all of these criteria without having an adverse effect on some other operating characteristic of the search unit. As a consequence, although some of the prior proposals for dampening the search units have been satisfactory for some applications, they have had other limitations which limit their usefulness for other purposes. As an example of one of the more successful materials used heretofore in ultrasonic search units, reference is made to U.S. Pat. No. 2,972,068 entitled UNIDIRECTIONAL ULTRASONIC TRANSDUCER assigned to Automation Industries, Inc.

SUMMARY

The present invention provides method and means for overcoming the foregoing difficulties. More particularly, an embodiment of the invention as disclosed herein includes a search unit having a transducer crystal specially dampened so as to provide the required degree of acoustical dampening. In this embodiment, a body of pressed fibers of a heavy, nonresonant material is bonded to the backside of the crystal. This provides a dampening structure which among other things is very "lossy" or highly attenuative and which has an effective acoustical impedance very closely approximating that of the crystal.

DRAWINGS

FIG. 3 is a cross-sectional view similar to FIG. 2 but showing another search unit embodying the invention in a somewhat different form.

DESCRIPTION

Figure 1:
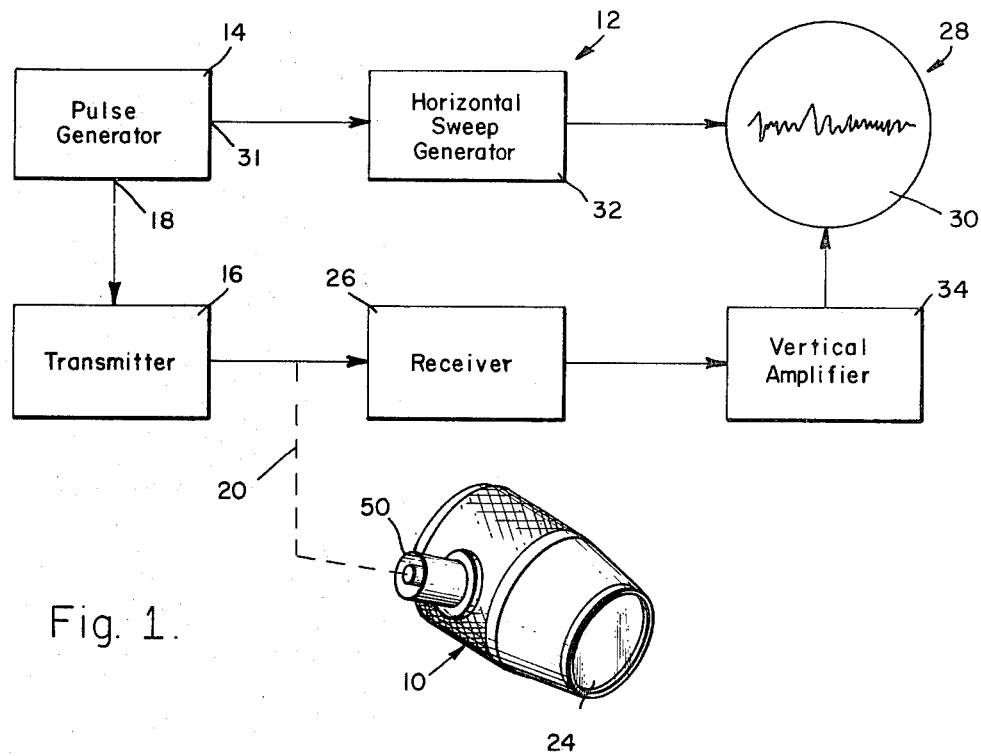
FIG. 1 is a block diagram of a nondestructive testing system employing a search unit embodying one form of the present invention.

Referring to the drawings in more detail, the present invention is particularly adapted to be embodied in an ultrasonic search unit 10 for use in an ultrasonic nondestructive testing system 12.

Although the search unit 10 may be employed in any type of ultrasonic nondestructive testing system (i.e., a continuous wave, pulsed, etc.) in the present instance it is shown as being embodied in a so-called pulse-echo system. Moreover, although the search unit 10 may function as just a transmitter or just a receiver, in the present instance it is shown functioning as a transmitter and receiver.

A typical pulse-echo type of system 12 is shown in FIG. 1. A pulse generator 14 produces a series of repetitively occurring clock or timing pulses. The clock pulses are effective to determine the repetition rate at which the entire system 12 operates. This repetition rate is not believed to be critical and may vary over a wide range. However, by way of example, it may be in the region of about 1 kilocycle per second.

A pulser or transmitter 16 is coupled to the output 18 of the pulse generator 14. The transmitter 16 is thereby made responsive to the timing pulses whereby it will operate in synchronism therewith. Each time a timing pulse occurs the transmitter 16 produces a pulse suitable for driving the search unit 10. This is normally a high voltage pulse of a radio frequency. The pulse may persist for a single cycle or just a part of a cycle. Alternatively, it may include a limited number of cycles, for example up to five or ten or somewhat more.

Normally, a coaxial cable 20 couples pulser-transmitter 16 to search unit 10. Search unit 10 may be a portable unit movable at the end of cable 20 so as to be coupled to a workpiece 22.

Included within search unit 10 is a transducer responsive to each driving pulse from transmitter 16 to generate a corresponding burst or pulse of ultrasonic energy. This ultrasonic burst is transmitted from face 24 of search unit 10.

The ultrasonic waves are passed from face 24 of the search unit into workpiece 22 from which reflections off of defects and other discontinuities within the workpiece are returned to the search unit. The acoustical coupling between face 24 and workpiece 22 is critical. The attenuation of ultrasonic energy in air is very substantial, especially at the higher testing frequencies. It is therefore desirable to provide an essentially air free coupling between search unit 10 and the workpiece. This is true even though face 24 of the search unit may in some cases be placed in direct contact with the workpiece. Some form of couplant is normally used. A thin film of water, glycerin, etc. between the workpiece and search unit face 24 is adequate.

In another type of testing, search unit 10 may be immersed in a liquid, such as water, and in proximity to a workpiece also submerged in the water. Thus although the search unit 10 in such case is spaced a substantial distance from the workpiece, it is nevertheless coupled thereto by the intervening water.

Returning ultrasonic reflections from discontinuities, such as defects, within the workpiece are incident on face 24 of the ultrasonic tester. These ultrasonic waves incident on face 24 are converted by the transducer within search unit 10 into corresponding electrical signals. The electrical signals generated in this manner are coupled back over coaxial cable 20 into receiver 26. The receiver 26 is effective to receive or detect the transduced electrical signals.

Receiver 26 may be coupled to instrumentation for utilizing or indicating the signals associated with the transducer of search unit 10. This instrumentation may be any of a wide variety of components and systems. In the present instance, and by way of example, an oscilloscope 28 is shown. The oscilloscope 28 includes a cathode ray tube 30 having horizontal and vertical deflection means (not shown).

A horizontal sweep generator 32 is coupled to a second output 31 of pulse generator 14 with the output of the horizontal sweep generator connected to the horizontal deflection means of oscilloscope 28. In this manner, each time a clock pulse occurs, the electron beam of the cathode ray tube is scanned horizontally across the face of tube 30.

The output of receiver 26 is coupled to a vertical deflection amplifier 34 which in turn is coupled to the vertical deflection means of oscilloscope 28.

A visual display is realized on the face of tube 30. The display includes a horizontal trace with one or more vertical marks spaced therealong. These marks correspond to the driving signal initially applied to search unit 10 and any signals produced by search unit 10 as a result of its receiving returning ultrasonic echoes.

The horizontal displacement of the marks along the trace corresponds to the time of reception and therefore is a function of the range or distance of the reflecting target. The amount of vertical deflection or vertical height of the oscilloscope trace is a function of the magnitude of the echo. This magnitude also represents the size of the workpiece discontinuity or defect, sometimes referred to as the target.

In order to transmit and receive ultrasonic energy, search unit 10 includes an electro-acoustic transducer 35. This is normally a piezoelectric member or crystal 36. The crystal 36 is normally a flat member of uniform thickness having parallel front and back sides or faces 38 and 40.

To apply and receive an electrical potential across crystal 36 faces 38 and 40 are normally provided with electrodes 42 and 44 respectively. Electrodes 42 and 44 are typically a very thin film of metal which is vapor deposited, electro-plated, etc. onto the crystal faces. When an electrical potential is applied to opposite sides or faces of crystals 36, the piezoelectric crystal is physically distorted. If this distortion is abruptly applied, the crystal tends to vibrate mechanically and radiates such mechanical vibrations as ultrasonic energy into the surrounding environment.

Conversely, when mechanical vibrations, herein ultrasonic energy, are incident upon crystal 36, an electrical potential is generated across faces 38 and 40 of the crystal. This generates an electrical signal varying in magnitude the same as the potential across the crystal faces. This potential is generally proportional to the amount of mechanical crystal distortion.

If the transducer is pulsed by an abruptly rising electrical driving signal, the crystal tends to vibrate or "ring." This causes the desired transmission of ultrasonic energy from the front surface or face 38 of crystal 36. However, at the same time a similar transmission of ultrasonic energy is produced from the rear or backside of the crystal.

If the crystal 36 is enclosed in a search unit housing 46, spurious and unwanted ultrasonic energy produced from the backside face 40 of crystal 36 is propagated into and throughout the housing. If these spurious ultrasonic waves are not dispersed, absorbed or otherwise dissipated they return to crystal 36 and materially interfere with the desired vibrational mode of the crystal.

Furthermore, although a certain amount of vibration of the crystal is necessary in order to transmit and receive ultrasonic energy, preferred operation of the search unit requires some limit to the amount of free crystal vibration. In particular, there exists an undesirable condition in which the crystal is said to "ring." Such a crystal "rings" or vibrates for too long after it is excited. Thus after the applied driving signal is terminated the crystal continues to vibrate for an extended interval. This continued "ringing" interferes with the proper reception of ultrasonic energy returned to the search unit from a workpiece. In other words, the "ringing" or vibrations should preferably diminish shortly after the driving signal has terminated so that the returning ultrasonic echoes from within the workpiece may be properly received.

In order to minimize if not eliminate altogether the spurious ultrasonic energy and sustained ringing in the operation of the search unit, it is desirable to provide some form of dampening on the back of crystal 36. The provision of such dampening tends to absorb and/or dissipate the spurious ultrasonic waves and prevent excessive "ringing."

On the other hand, this dampening should allow a certain freedom of vibration of the crystal to enable it to transmit and receive the ultrasonic energy from the workpiece. Therefore, too much dampening is as undesirable as insufficient dampening. Finding a material or dampening structure which provides an intermediate dampening characteristic, together with other desirable features previously discussed, is difficult.

Figure 2:
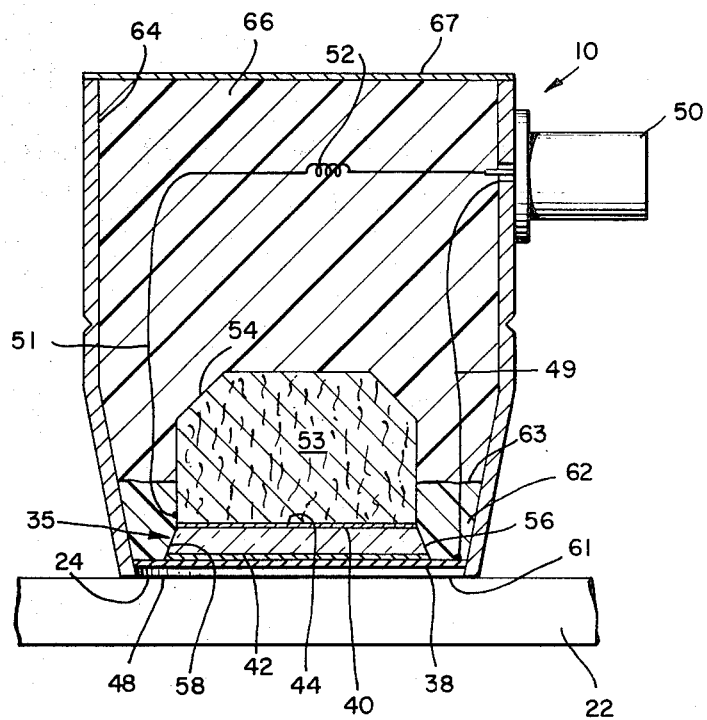
FIG. 2 is a cross-sectional view of the search unit of FIG. 1.

As best seen in FIG. 2, the various elements or components of search unit 10 including a dampening structure are compactly sealed inside protective housing 46.

Transducer 35 including crystal 36 and its electrodes 42 and 44 are mounted adjacent the front or forward end of the housing. A protective wearplate 48 may be provided in planar adjacency with transducer 35 to protect crystal 36 and its front electrode 42. The face 24 of search unit 10 therefore is provided by a front face of wearplate 48 which may be disposed in essentially intimate, direct contact with workpiece 22.

A suitable connector 50 may be provided on the exterior of housing 46 for electrically interconnecting transducer 35 with the transmitter 16 and receiver 26. Normally this connector 50 is of a variety suitable for receiving a standard coaxial connector which may be provided at the end of the coaxial cable 20.

Internally of housing 46, connector 50 is electrically coupled to electrodes 42 and 44 by means of lead wires 49 and 51 respectively. An inductor 52 may be provided for tuning the impedance of search unit 10 to cable 50, transmitter 16 and/or receiver 26 if desired. Here inductor 52 is connected in series with lead wire 51 joining the center conductor of connector 50 with the rear or backside electrode 44 of the transducer.

Thus an electro-acoustic transducer is provided including a piezoelectric transducer means, here in the form of transducer 35 for transmitting ultrasonic energy in response to an electrical signal and for generating an electrical signal in response to received ultrasonic energy. These electrical signals are communicated over cable 20 from transmitter 16 and to receiver 26.

Included within the interior of search unit 10 is a backing or acoustical dampening structure 53 for minimizing spurious ultrasonic waves and excessive crystal "ringing." Structure 53 is disposed in direct, intimate contact with the rear of transducer 35, here being a surface of electrode 44.

Structure 53 is effective to absorb ultrasonic energy propagated rearwardly from crystal 36 and to provide a controlled amount of dampening of the crystal vibration. This controlled dampening serves to attenuate crystal "ringing" following an electrical driving signal so that sustained self vibrations of the crystals do not interfere with reliable receipt of ultrasonic echoes from the workpiece. Structure 53 may also exhibit an acoustical impedance closely matching that of transducer 35 so as to effectively receive and dissipate rearwardly propagated ultrasonic energy without generating energy reflections at the interface between structure 53 and the transducer.

It has been found that superior acoustical dampening is realized by forming structure 53 of pressed or compacted fibers of a dense, non-resonant material such as lead. These fibers may be pressed or compacted in molds to the desired size, shape and density. The resulting structure, such as structure 53 in FIG. 2 may thereupon be cemented, soldered or otherwise bonded to a rear or backside face of transducer 35, here including electrode 44.

The fibers themselves may be specially machined, or obtained from commercially available stranded lead, fiberous lead or lead wool. The precise diameter of the fibers forming structure 53 is not believed critical and the fiber diameter may vary depending upon such factors as the frequency of the ultrasonic energy, etc. However, it has been found that finer strands of fiber produce the best results. For example, strands having a diameter of less than 0.05 inches and preferably having a diameter of about 0.01 inches produce the best results.

The size of structure 53 may vary depending upon the intended use or application of the search unit 10. In general, structure 53 may be sized so as to contact transducer 53 over the majority of its rear face. The rear face of the transducer here includes crystal face 40 and the electrode 44 deposited thereon. Similarly, the exact thickness of structure 53, i.e., the dimension normal to crystal face 40, is not believed to be critical; however, it has been found that the thickness should be greatest at relatively lower frequencies.

Structure 53 may be pressed or molded into many various shapes. In this instance, a cylindrical configuration coaxial with search unit 10 is employed having an upper beveled or sloping portion 54. Sloping portion 54, here defining a truncated conical surface at the rear of structure 53 is used in the present embodiment, to assist in the absorption of ultrasonic energy reflected rearwardly of transducer 35. However, dampening structures without the rear or sloping portion have also been found useful.

Shapes for structure 53 other than that shown in FIG. 2 are contemplated. For example fiberous lead pressed into acoustical lens configurations of convex and/or concave surfaces and bonded to the transducer by solder or other bonding substance have produced good results. This lends shape has the appearance of an optical lens with convex or concave surfaces coaxial with crystal 35 of search unit 10.

The amount of compaction or pressing of the fibers into structure 53 can vary over a wide range. In general the compaction pressure need not be so substantial that it eliminates most of the air space between the fibers. A light to moderate compaction pressure has been found suitable.

Search units constructed with a compressed or compacted fiberous lead structure 53 have been found to provide a very rugged construction which is extremely stable with time. It is believed that the intertwined fibers unify the structure so that one portion cannot vibrate relative to another and thereby cause electro-acoustical noise and loss of dampening. On the other hand, the individual fibers and remaining air space in the compacted structure present characteristics which result in desired acoustical absorption and dampening.

It has been found preferable to organize or arrange the fibers within structure 53 so as to minimize reflections from minute discontinuities presented by the individual fibers within structure 53. Although such reflections result in only a low level noise, it is nevertheless undesirable in certain high performance ultrasonic test equipment. To minimize even this low level noise, it may be desirable to employ a backing or dampening structure in which the fibers are organized in a longitudinal or columnar bundle as illustrated and discussed in connection with FIG. 3 below. On the other hand, there may be applications where the low level noise is tolerable. In such case, a random orientation of the fibers may be used.

In the presently disclosed embodiment, the dense, non-resonant material from which the fibers of structure 53 are formed is lead or a material substantially of lead. However, it is believed that other substances provide characteristics similar to the desirable properties of lead and may be employed in its place or in combination therewith. Preferably, the material should be heavy or dense and thus a metal material is desirable.

The material should also have properties which cause it to be non-resonant in the intended ultrasonic application. The characteristic softness of lead is one property which contributes to this non-resonant characteristic. Its low tensile strength may also be a factor in producing this non-resonant property.

Accordingly, the fibers of structure 53 may be formed of other materials which are dense and non-resonant. For example, tin, silver, gold, platinum and other similar metals may be used in this regard. Furthermore, these metals may be combined among themselves or with lead to present alloys from which fibers may be formed. A mixture of fibers of various materials may also be used. These metal fibers may be specially machined or purchased commercially as a standard metal, fibrous metal, metal wood, felt metal, etc.

However, for an economical structure providing superior dampening and absorption characteristics, compacted fibers formed substantially of lead is believed at this time to be the best embodiment.

In assembling search unit 10, the first step is to select an appropriate crystal 36 for transducer 35. The particular piezoelectric material and the dimensions of crystal 36 are chosen so as to be appropriate for the frequency, power levels, etc., at which search unit 10 will operate.

Although the crystal may be of any desired shape, it is normally a flat disc of uniform thickness; i.e., faces 38 and 40 are planar and parallel. The periphery of crystal 36 may be cylindrical. However, it has been found that certain noise problems which may occur when the crystal 36 is operated at low frequencies (i.e., below about 2.25 megacycles), may be eliminated or minimized if the periphery 56 is beveled or chambered at an angle of about 30°.

The two faces 38 and 40 of crystal 36 are provided with electrodes 42 and 44. Each of the electrodes 42 and 44 is normally a thin layer of electrically conductive material. Any suitable means may be employed for attaching electrodes 42 and 44 such as by bonding a thin film onto the crystal surface with an electrically conductive cement. Vapor depositing, sputtering, electrodepositing, electroplating, etc., may also be employed.

The exposed surface of the rear electrode 44 (normally the electrical positive electrode) is preferably lightly buffed with emery, croquis cloth, etc. The grit should be a very fine grit so as not to destroy the electrode 44. The purpose of this step is to improve the adhesion or bond between the electrode surface and the backing or dampening structure 53.

Next, an electrical lead wire 51 may be electrically and mechanically attached to rear electrode 44. This is normally accomplished by soldering the wire directly on to electrode 44. Although lead wire 51 may be attached at or very near the center of the electrode and crystal, it has been found desirable to place this connection on the electrode near the edge of the crystal.

Backing or dampening structure 53 may now be prepared for mounting on transducer 35. The metal or lead fibers may have been previously machined from lead bars to produce a particular strand diameter, or the already prepared fibrous material of metal or lead wool may be used. The fibrous material is placed within a mold having a configuration which will produce a desired shape for structure 53 or from which a desired shape may be machined.

The material is thereupon compacted or pressed into a tightly knit body of fibers. If desired, this body may be further shaped by machining or other suitable shaping means. For example, the compaction mold may produce a cylindrical slug or pellet of pressed fibers. This pellet may be machined to provide the beveled or sloping portion 54 of structure 53 as shown in FIG. 2.

The diameter of the individual fibers may be selected in light of the intended use for search unit 10. As indicated above, it has been found that the finer strands, approaching 0.01 inches in diameter, produce the best results.

The amount of compaction pressure may also vary. In general, a light to moderate compaction pressure is adequate to produce a mechanically strong backing structure having the desired ultrasonic attenuation and absorption characteristics.

In this instance structure 53 is bonded to transducer 35 by smoldering. In such case the compaction of the fibers may be such that solder is allowed to penetrate to a controlled depth into the structure. A controlled depth of penetration of the solder is advantageous in soldering the dampening structure 53 to the transducer electrode.

Before structure 53 and electrode 44 of the transducer are joined, the mating surfaces of these parts may be tinned or wetted by a controlled amount of heated and thus liquified solder. A certain amount of solder will penetrate into the body of structure 53.

Before the solder has solidified, structure 53 is moved into contact with the exposed surface of electrode 44 and the solder is allowed to harden and thereby form the desired bond.

The composition of the bonding solder may vary. Its components may include lead, tin, silver, etc. in varying proportions. A bonding material commercially available under the trademark of Cerroseal may be employed as the sole bonding agent or in combination with a solder.

Alternatively, other bonding techniques may be used such as cementing, epoxying, etc. If the search unit is to be of a "contact" type as contrasted with an "immersion" type, then wear plate 48 is attached to the transducer. Alternatively, wear plate 48 may be affixed to the transducer prior to the mounting of backing or dampening structure 53.

If a wear plate is employed, the following procedures are followed. Wear plate 48 may be any desired material. It is preferable to use a relatively hard material which can withstand considerable abrasion and wear but will not mar the surface of test object 22. It should also have suitable acoustical properties, i.e. impedance, low loss, etc. It has been found that a high density aluminum oxide is well suited for this purpose.

When a wear plate, such as plate 48, is employed, it may be provided with an electrode 58 adjacent the transducer. In this instance, electrode 58 will combine with electrode 44 at the rear of crystal 36 to apply and receive an electrical field across the crystal material. In other applications, electrode 42 formed directly on a front face 38 of the crystal may have an electrical lead connected directly thereto for applying and receiving this electrical potential. In still other embodiments, it may be desirable to eliminate wear plate 58 and lap electrode 42 entirely from crystal 36 whereby the entire crystal face 38 is exposed. In such case, an external electrode may be employed in place of either electrode 42 or electrode 58 at the front of the crystal. Such an external electrode may be provided by the work piece 22 itself, if a good conductor, or various removable conductive foils, such as an aluminum foil, may be used.

In this instance wear plate 48 is provided with electrode 58 by vapor depositing a combination of chromium and gold onto one of the major faces or surfaces of the plate. Plate 48 and its electrode 58 may be of a larger diameter than the adjacent periphery 56 of transducer 35 to accommodate the connection of a negative lead wire 49 to electrode 58 as shown. Lead wire 49 may be soldered directly on to this electrode surface.

Following this, the electrode surface of wear plate 48 is coated with a suitable bonding agent such as a low-viscosity epoxy resin. This prepared surface is thereupon placed in contact with electrode 42 of transducer 35. It is best to "ring" the wear plate 48 down onto crystal 36 to insure an effective intimate bond. When in its final position wear plate 48 should be concentric with crystal 36 and extend slightly beyond the perimeter or periphery of the crystal at the interface between the two parts.

Once the wear plate 48 is properly positioned to the crystal transducer it should be subjected to a very substantial pressure (i.e., about 25 to 50 lbs.) and the bonding resin allowed to fully cure. This completes a subassembly including transducer 35, backing or dampening structure 53 and a wear plate 48.

This subassembly may now be mounted within outer housing 46. To accomplish this, a front open end of cylindrically shaped housing 46 is placed over the subassembly while wear plate 48 rests on a planar surface. In this instance, the interior periphery of opening 61 mates with the outer circumference of wear plate 48 as shown. In the alternative, a bushing structure may be mounted between the circumference of plate 48 and the inside surface of housing 46 if desired. Wear plate 48 may be substantially flush with or extend just beyond the front edge of housing 46 adjacent opening 61.

The relative position between housing 46 and the transducer subassembly including wear plate 48 may be adjusted by partially filling a lower or front portion of housing 46 with a resin 62 up to a separation line 63. This resin 62 may be allowed to cure. During the curing process, the relative position of the transducer subassembly and particularly wear plate 48 may be adjusted relative to the front edge of housing opening 61 to provide the desired protrusion of wear plate face 24. Resin 62 may be poured into place through an open top 64 of housing 46.

At this point the partially assembled search unit 10 may be tested to insure that it is fully operative. In addition, the capacitance of the assembly should be measured. If desired, a small inductance 52 may be added, here connected in series with lead wire 51. This inductance will be effective to tune the search unit 10 whereby it will have the desired reactance at the intended operating frequency.

Lead wire 58 is connected through inductor 52 to a center conductor of coupling 50. The ground or negative lead 49 is connected to the outer conductor shield of coupling 50.

Next, the remaining interior free space region of housing 46 is completely filled with resin 66. Resin 66 is filled from separation or fill line 63 to the top of the housing. Following curing of resin 66, a nameplate 67, including a suitable label etc., may be cemented on to the rear or upper housing portion of the search unit as shown.

If search unit 10 is intended to be of the immersion variety, the assembly procedure is generally the same as described above, except that wear plate 48 is not used. Instead, a subassembly including transducer 35 and backing or dampening structure 53 is mounted and secured into housing 46. A suitable acoustic lens (not shown) is cast and/or bonded onto the front of housing 46 in intimate contact with the forward face of transducer 35. This lens is cast from a material having the proper acoustical impedance, etc., for coupling the crystal to the liquid couplant, such as water, etc., used in the immersion bath.

As indicated, it is preferable to organize or arrange the fibers within dampening structure 53 so as to eliminate or minimize low level noise caused by acoustical reflections off of the individual fibers. FIG. 3 shows an alternative dampening structure in which the fibers are arranged for this purpose. In FIG. 3, the primed reference numerals correspond to parallel usage of the unprimed reference numerals of FIG. 2. Thus search unit 10' of FIG. 3 includes a dampening structure 53'.

Structure 53' is provided with its fibers or strands arranged in a manner that yields a more continuous propogation path for the ultrasonic energy. As indicated above, it is believed that the low level noise attendant randomly oriented fibers is due to the longitudinal and lateral acoustical reflections from minute fiber discontinuities within the dampening structure.

In contrast, structure 53 is arranged with its fibers in a longitudinal bundle or straight columnar configuration.

In particular, a plurality of strands of lead or other dense, non-resonant material are formed and arranged parallel with one another in a bundle. A die may be employed to press or compact these strands laterally into a tighter bundle of straight columnar strands. This partially compacted bundle may thereupon be threaded into a pressing die and pressed and further compacted therein without substantially disturbing the straight longitudinal orientation of the strands. Following the pressing operation, the material may be cut to length so as to form a cylindrical slug or pellet with the fibers arranged substantially longitudinally of the pellet axis.

Thus pressed into a firm pellet, it may be bonded to transducer 35' as backing or dampening structure 53'. Here the dampening structure 53' is mounted relative to the transducer such that the longitudinal fibers extend substantially perpendicularly or normal to the planar faces thereof.

An axial end of the pellet which is to be mounted on the backside of the transducer is first tinned with a controlled amount of solder. This controlled amount of solder may penetrate into the fibrous bundle to a depth 71 as illustrated. Penetration of the solder into the bundle improves the bonding, by soldering, of structure 53' to the transducer.

With the structure 53' so tinned, liquid solder may be applied to wet the mounting surface of the pellet and an exposed surface of rear electrode 44'. The two parts are then brought together to allow the solder to harden and complete the bond.

The remaining components of search unit 10' are formed and assembled in a manner described in connection with search unit 10 of FIG. 2. Search unit 10' formed with a dampening structure 53' having compacted and longitudinally organized lead fibers proves to have superior operating characteristics. The signal amplitude of ultrasonic energy propogated into workpiece 22' is very good. Thus the structure does not overdamp the crystal vibrations.

Moreover, the dampening provided by structure 53' of search unit 10' showed very good attenuation over a time interval equal to one cycle of the applied driving signal. This represents a measure of the efficiency of the dampening which, as mentioned above, must rapidly attenuate any otherwise sustained "ringing" of the crystal so as not to interfere with the reception of ultrasonic echoes from the workpiece. Similarly, absorption of spurious ultrasonic waves propogated rearwardly of transducer 35' is excellent.

We claim:

1. An electro-acoustic ultrasonic search unit for use in an ultrasonic nondestructive testing system, said search unit including the combination of:
   a piezoelectric transducer means having a pair of parallel faces on the opposite sides thereof for transmitting ultrasonic energy in response to an electrical signal applied to said faces and for generating an electrical signal between said faces in response to received ultrasonic energy, and
   acoustic dampening means for said transducer means, said dampening means including fibers of a dense, non-resonant material compressed together into a rigid mass and acoustically coupled to one of said faces.

2. The search unit of claim 1, wherein said material is metal.

3. The search unit of claim 2, said dampening means further including a solder penetrating and binding at least a portion of the exterior surface of said compressed metal fibers onto said face.

4. The search unit of claim 2 wherein said metal fibers of said dampening means are produced substantially of lead.

5. The search unit of claim 2, wherein said fibers of said dampening material having a strand diameter less than 0.05 inches.

6. An ultrasonic search unit for use in an ultrasonic nondestructive testing system, said search unit including:
   a search unit housing,
   a piezoelectric transducer disposed in said housing and having front and rear faces, said transducer being adapted to transmit ultrasonic energy from said faces in response to a driving signal and to generate an electrical signal in response to ultrasonic energy incident upon said faces,
   an acoustical dampening structure in said housing in intimate contact with the rear face of said transducer,
   said dampening structure including a bundle of pressed metal fibers bonded to said transducer.

7. The ultrasonic search unit of claim 6 wherein said metal fibers are lead and are selected to have a strand diameter less than 0.05 inches and are compacted into an integral rigid mass.

8. The search unit of claim 7, wherein said pressed metal fibers are bonded to said transducer by a solder, said solder at least partially penetrating into the body of said pressed metal fibers.

9. An ultrasonic search unit for use in an ultrasonic nondestructive testing system, said search unit including the combination of:
   piezoelectric transducer means for transmitting ultrasonic energy in response to an electrical signal, and for generating an electrical signal in response to received ultrasonic energy, and
   acoustic dampening means for said transducer means, said dampening means including fibers of a dense, non-resonant material, said fibers being compressed together and acoustically coupled to one side of said transducer means, said compressed fibers being arranged in a substantially straight columnar configuration normal to said transducer means.

10. An electro-acoustic ultrasonic search unit for use in an ultrasonic nondestructive testing system, said search unit including the combination of:
    piezoelectric transducer means for transmitting ultrasonic energy in response to an electrical signal and for generating an electrical signal in response to received ultrasonic energy,
    said transducer means being formed with parallel plane surfaces on the opposite sides for transmitting and receiving ultrasonic energy in directions normal thereto, and
    acoustic dampening means for said transducer means including fibers of a dense, non-resonant material,
    said fibers being disposed in intimate contact with one of said surfaces and disposed in a straight columnar configuration substantially perpendicular to said surfaces.

* * * * *